United States Patent [19]

Gössner

[11] Patent Number: 4,605,320
[45] Date of Patent: Aug. 12, 1986

[54] DEVICE FOR SUPPORTING SPINDLES

[75] Inventor: Matthias Gössner, Malente, Fed. Rep. of Germany

[73] Assignee: Dr. Ing. Rudolf Hell GmbH, Fed. Rep. of Germany

[21] Appl. No.: 792,036

[22] Filed: Oct. 28, 1985

[30] Foreign Application Priority Data

Nov. 2, 1984 [DE] Fed. Rep. of Germany ....... 3440039

[51] Int. Cl.⁴ .............................................. F16C 13/06
[52] U.S. Cl. .................................. 384/494; 384/549; 384/558; 384/583
[58] Field of Search ............... 384/494, 549, 558, 583, 384/546, 587

[56] References Cited

U.S. PATENT DOCUMENTS

| | | | |
|---|---|---|---|
| 3,648,992 | 3/1972 | Durinck et al. | 384/549 |
| 3,836,103 | 9/1974 | Retali et al. | 384/549 |
| 4,249,784 | 2/1981 | Ichikawa | 384/494 |
| 4,552,508 | 11/1985 | Reid | 384/549 |

*Primary Examiner*—Lenard A. Footland
*Attorney, Agent, or Firm*—Hill, Van Santen, Steadman & Simpson

[57] ABSTRACT

A support is provided for high-precision, long threaded spindles which are extremely thin, and which are employed in systems in electronic reproduction technology, machine tools, measuring instruments, and the like. The support includes a bearing block pivotable in three dimensions through use of a hemispherical support bearing. The bearing block has two rollers thereon, one of which is slightly tiltable.

7 Claims, 2 Drawing Figures

DEVICE FOR SUPPORTING SPINDLES

BACKGROUND OF THE INVENTION

The present invention relates to a device for supporting threaded spindles in order to prevent a sag thereof due to a dead weight of the spindle, and/or sag which would arise from a nut segment engaging into the spindle from above. The supporting elements of the invention are largely maintenance free, self-seeking, and support the spindle on rollers so that no sliding friction occurs.

The problem often exists in machines in electronic reproduction technology, machine tools, adjustment devices, and the like that high-precision spindles must be seated in self-bearing fashion over great lengths. As a consequence of the dead weight of the spindles, a sag between the bearing points thereby arises, this sag resulting in the required precision being in doubt in many cases. There are many applications (for example given threaded spindles for conveying machine tool carriages, etc.) in which for delivering longitudinal motion to the carriage, a nut segment can engage (through a spring force if needed) with threads of the spindle proceeding from above. Of course, resilient devices again increase the sag of the free spindle and thus increase the imprecision.

German AS No. 1 243 496, incorporated herein by reference, discloses a fixed stay for processing cylindrical workpieces wherein the workpiece is supported by means of rollers. Although the roller blocks in which the rollers are seated are tiltable around a shaft lying parallel to the workpiece axis so that they are self-seeking in the plane orthogonal to the workpiece axis, they are not self-adjusting in the plane perpendicular thereto, so that small errors in parallelism of the roller axes are not compensated. Furthermore, none of the rollers is movable on all sides around the center of its body, so that the rollers could automatically compensate a lack of parallelism with respect to their own running shafts. The rollers are thus not compelled to find a line contact against the rotational member to be supported.

The German utility model No. 69 22 062, incorporated herein by reference, discloses a roller bearing for conveyor spindles. However, the publication is predominantly related to roller elements which replace the use of a nut segment. Although support elements for the spindles with rollers are mentioned, they are not disclosed in detail.

German utility model No. 81 17 878.6, incorporated herein by reference, discloses a spindle support for threaded spindles which are extremely thin. The spindles are free-turned to a diameter less than a diameter of their threaded core at the locations at which the support bearings act. In order to bridge these irregularities, the nut segment is designed sufficiently long such that it covers the free-turned locations. In addition to plain bearing half-liners, rollers as supporting elements are also mentioned here, but their design is not disclosed in greater detail.

None of the known devices show roller supporting elements which automatically find a line contact when placed on the spindle.

SUMMARY OF THE INVENTION

An object of the present invention is to create a maintenance-free spindle support with "self-seeking" alignment of the supporting elements with rolling friction for ideal spindle position.

According to the invention, at least one carrier member is connected to a base portion of a machine with which the spindle to be supported is associated. A height-adjustable circular head member is associated with the carrier member and is positioned below a rotational axis of the spindle. A substantially U-shaped roller bearing block is situated on the spherical head such that it is flexibly rotatable about three mutually orthogonal axes (three dimensional). Two supporting rollers are seated in the roller bearing block such that their respective rotational axes are parallel to the spindle rotational axis. A first one of the rollers is seated in a play-free manner. The second roller is seated in a tiltable manner about a center thereof. Means are provided for limiting a tilt motion of the secon roller.

DESCRIPTION OF THE PREFERRED EMBODIMENTS

Figure 1:
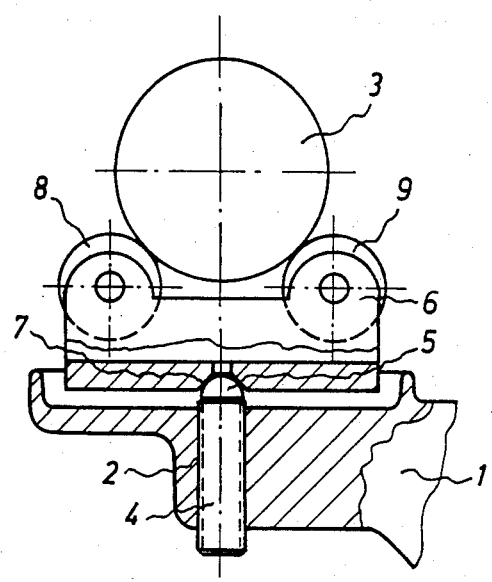
FIG. 1 illustrates a supporting element of the invention in a side view.
Figure 2:
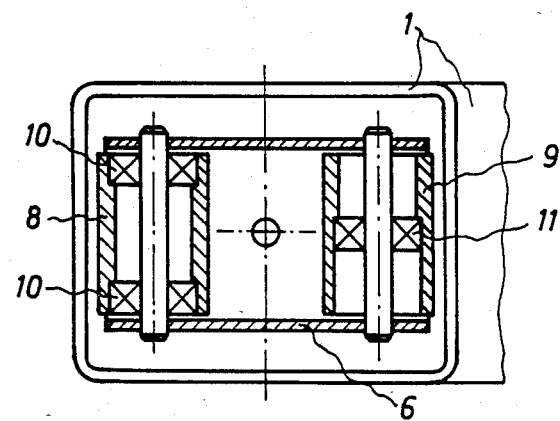
FIG. 2 illustrates the supporting element of the invention in a plane view.

The carrier 1 secured to the basic machine body comprises a threaded bore 2 which is situated such that it lies perpendicularly under the center axis of the spindle 3 to be supported. Let it already be emphasized here that the bearing location need not be particularly precise. A threaded pin 4 is screwed into the threaded bore 2, which preferably has a fine-pitch thread. This threaded pin 4 has a hemispherical head 5 at its end facing the spindle 3. The surface of this head 5 is advantageously hardened and polished. An essentially U-shaped roller bearing block 6 having a conical countersink 7 is seated on this head 5. It is flexibly movable (rotatable about three mutually perpendicular axes) on all sides by means of this type of bearing, within limits. Rollers 8 and 9 are seated in this roller bearing block 6 such that their axes lie essentially parallel to one another and to the axis of the spindle 3 to be supported. The roller 8 is as play-free as possible. For instance, it is seated by means of two roller bearings 10 in its end faces. The roller 9 is seated such that it can execute slight tilting motions on all sides around the center of its body. This can be effected, for example, by situating a single deep groove ball bearing 11 at its middle. This, of course, has a certain tilting play. A common bearing having a liberal fitting, potentially even having a crowned running surface on an elastic adapter element in the bearing, can also be used.

The invention functions as follows. During assembly, the roller bearing block 6 is moved sufficiently far by tightening the threaded pin 4 such that the fixed roller 8 first presses against the spindle. When the threaded pin 4 is turned further, the roller bearing block 6 tilts around the spherical head 5 to such a degree that the roller 9 also comes into a line contact with the outside surface of the spindle 3. Slight imprecisions are thus compensated by the play of the bearing of the roller 9, so that both rollers lie parallel to the axis of the spindle 3 in any case and are each in line contact therewith. Subsequently, the supporting elements are tightened to such a degree that the sag is compensated. The threaded pin 4 is fixed in this position. The fixing is not shown in the figures and can be effected, for instance, by a counter-nut or by slots of the nut thread and a locking screw.

The tilting play of the roller 9 dare not be arbitrarily great as would be the case, for instance, given application of a pendulum bearing. On the one hand, the play must be great enough in order to compensate slight manufacturing imprecisions, but on the other hand must be so limited that the roller cannot tilt to such degree in the plane of its contacting line that the line contact changes into an undesired point contact. Theoretically, this is the case given every non-parallelism of the axes. However, practice has shown that an error of second order in the supporting image is small, even when the allowable tilt error lies within a range at which manufacturing imprecisions can be reliably compensated.

COMMERCIAL USE

The invention is employed in devices for electronic reproduction technology as well as in machine tools, measuring instruments, etc. It can be employed everywhere that extremely thin, long threaded spindles shafts or axles must be supported for precision reasons.

Although various minor changes and modifications might be proposed by those skilled in the art, it will be understood that I wish to include within the claims of the patent warranted hereon all such changes and modifications as reasonably come within my contribution to the art. It lies in the scope of the present invention that for the support of a spindle more than one of such carrier members may be used.

I claim as my invention:

1. A device for supporting long threaded spindles to prevent sag of the spindles due to their dead weight at a free-bearing portion thereof, comprising:
    at least one carrier member connected to a base of a machine with which the spindle is associated, the carrier member having a height-adjustable spherical head positioned below a rotational axis of the spindle;
    a substantially U-shaped roller bearing block and means for situating the roller bearing block on the spherical head so as to permit rotation of the roller bearing block about three mutually perpendicular axes;
    first and second supporting rollers seated in the roller bearing block such that their respective rotational axes lie parallel to said spindle rotational axis;
    the first roller having means for seating it in play-free fashion, and the second roller having means for seating it so as to permit a limited tilting motion about a center thereof; and
    means for limiting the tilting motion of the second roller.

2. A device according to claim 1 wherein the means for seating the first roller in the roller bearing block comprises first and second roller bearings located substantially at opposite ends of the rotational axis of the first roller.

3. A device according to claim 1 wherein the means for seating the second roller comprises a bearing located substantially centrally of the rotational axis of the second roller.

4. A device according to claim 3 wherein the bearing seating said second roller comprises a single deep groove ball bearing situated along the roller at a center of its rotational axis such that normal play thereof permits tilting of the second roller.

5. A device according to claim 4 wherein the single deep groove ball bearing permits tilting of the second roller about both first and second mutually perpendicular axes which are themselves perpendicular to the rotational axis of the second roller.

6. A device for supporting long threaded spindles to prevent sag of the spindles at a free-bearing portion thereof due to their dead weight, comprising:
    at least one carrier member attached to a machine with which the spindle is associated;
    a roller bearing block having first and second rollers associated therewith;
    adjustment means associated with the carrier member for moving the roller bearing block towards the spindle such that the first and second rollers make line contact with the spindle;
    the adjustment means having a bearing means associated therewith so as to permit the roller bearing block to be freely tiltable relative to the adjustment means in three dimensions;
    first roller bearing means for supporting the first roller in the roller bearing block in a substantially play-free manner; and
    second roller bearing means for supporting the second roller in the roller bearing block so as to permit tilting thereof relative to the roller bearing block.

7. A device according to claim 6 wherein the adjustment means comprises a threaded pin received in the carrier member, and wherein the bearing means comprises a substantially hemispherical head on an end of the threaded pin, the roller bearing block having a complementary conical depression shaped to receive the hemispherical head.

* * * * *